D. W. REED.
Cotton-Planter.

No. 196,933. Patented Nov. 6, 1877.

WITNESSES:
W. W. Hollingsworth
John C. Kernon

INVENTOR:
Daniel W. Reed
BY
ATTORNEYS.

UNITED STATES PATENT OFFICE.

DANIEL W. REED, OF ALLENTON, ALABAMA.

IMPROVEMENT IN COTTON-PLANTERS.

Specification forming part of Letters Patent No. 196,933, dated November 6, 1877; application filed October 2, 1877.

*To all whom it may concern:*

Be it known that I, DANIEL W. REED, of Allenton, in the county of Wilcox and State of Alabama, have invented a new and Improved Cotton-Planter; and I do hereby declare that the following is a full, clear, and exact description of the same.

The invention is an improvement in the class of planters in which vertically-reciprocating toothed bars are employed to assist in discharging the seed from the hopper.

The improvement relates to the construction and arrangement of parts, as hereinafter described and claimed.

Figure 1:
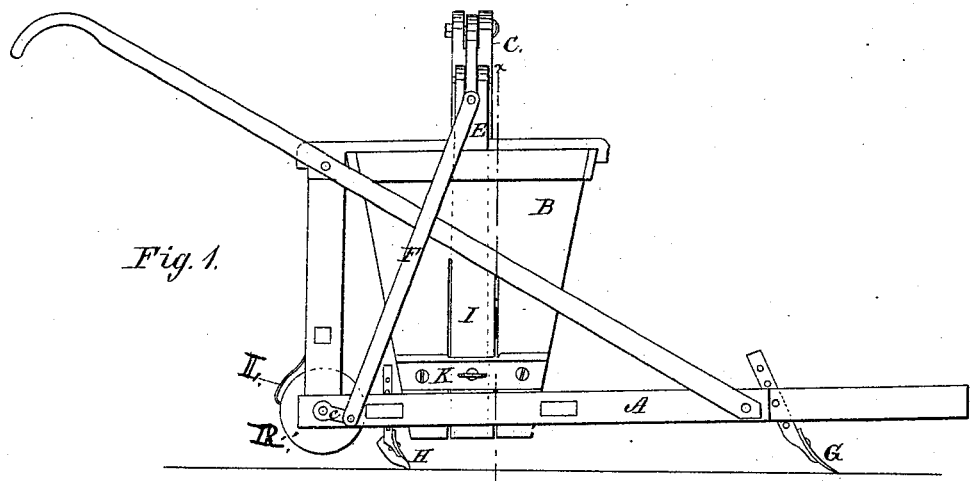
Figure 2:
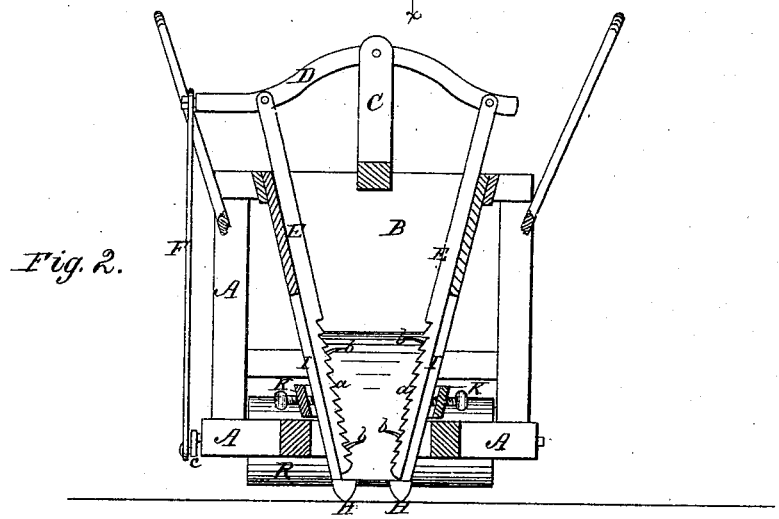

In the accompanying drawing, forming part of this specification, Figure 1 is a side elevation, and Fig. 2 a vertical section on line $x\ x$ of Fig. 1.

A indicates the frame, and B the hopper, of my cotton-planter. A short standard, C, is fixed in a cross-bar spanning the top of the hopper, and constitutes the fulcrum-support of a curved oscillating lever, D, to the respective ends of which are jointed the seed-rubbing and discharge bars E. These bars work in grooves or other suitable guides in opposite sides of the hopper, and their lower ends are provided with notches $a$ and one or more teeth, $b$.

The lever D is oscillated by means of connecting-rod F and roller R, which latter is journaled in the rear end of the frame A, and is provided with a crank, $c$, as shown, to which the said rod is attached.

In practical operation the furrow is opened by the plow or scooter G, the seed deposited therein, the furrow closed by shovels H, and the earth leveled and smoothed by the roller R.

The function of the bars E is to agitate the whole quantity of seed in the hopper, and especially to rub the seed between their notched and toothed ends, thereby tearing and separating the adhering fibers, and causing a uniform discharge of seed from the hopper. This they are enabled to do by their reciprocation in reverse directions simultaneously, as will be readily understood.

In order to adjust the lower ends of bars E nearer to or farther from each other, and by thus widening or narrowing the space between them cause the seed to discharge with greater or less rapidity, I provide the sides of the hopper, directly in rear of the seed-bars, with adjustable sections I. These are formed by slitting the sides of the hopper upward from the bottom, and thus form tongues or pieces, which may be sprung or pressed inward against the seed-bars E by means of the set-screws K.

In addition to its function as a cotton-planter, the machine is adapted for distributing guano without change of construction.

I employ a scraper, L, for removing the soil which may adhere to the roller, and I regulate the depth at which the scooter or furrow-opener G and coverers H enter the earth by means of pins inserted in holes in the shanks thereof.

What I claim is—

1. In a cotton-planter, the combination of the reversely-reciprocating seed-discharge bars, the spring-sections of the hopper, and the screws for adjusting the lower ends of the sections, substantially as shown and described.

2. In a cotton-planter, the reversely-reciprocating toothed bars E E, having their lower ends corrugated or notched for the purpose of forming roughened surfaces between which the seed may be rubbed while being discharged, the hopper B, and the oscillating lever D, all combined and arranged as shown and described.

DANIEL W. REED.

Witnesses:
A. W. CANNO,
J. HENDERSON.